US006153270A

United States Patent [19]
Russmann et al.

[11] Patent Number: 6,153,270
[45] Date of Patent: Nov. 28, 2000

[54] PROCESS FOR APPLICATION OF AN INORGANIC COATING TO AN ELECTRICALLY CONDUCTING BODY

[75] Inventors: Horst Russmann, Hasbergen; Thomas Kruse, Dortmund; Hans-Detlef Hinz, Schwerte, all of Germany

[73] Assignee: Ewald Dorken AG, Herdecke, Germany

[21] Appl. No.: 09/308,030

[22] PCT Filed: Nov. 13, 1997

[86] PCT No.: PCT/DE97/02661

§ 371 Date: May 13, 1999

§ 102(e) Date: May 13, 1999

[87] PCT Pub. No.: WO98/21382

PCT Pub. Date: May 22, 1998

[30] Foreign Application Priority Data

Nov. 13, 1996 [DE] Germany ........................... 196 46 724
Jan. 31, 1997 [DE] Germany ........................... 197 03 489

[51] Int. Cl.[7] ........................................ C08F 2/46

[52] U.S. Cl. ......................... 427/522; 427/120; 427/124; 427/309; 427/318; 427/328; 427/374.1; 427/379; 427/380; 427/386; 427/388.1; 427/398.5; 427/398.1; 427/409; 427/419.1; 427/421; 427/427; 427/458; 427/534; 427/541; 427/543; 427/544; 427/591

[58] Field of Search .................................... 427/534, 541, 427/543, 544, 591, 120, 124, 309, 318, 328, 398.1, 522, 388.1, 374.1, 379, 380, 398.5, 409, 419.1, 386, 427, 421, 458

[56] References Cited

U.S. PATENT DOCUMENTS

| | | |
|---|---|---|
| 3,619,231 | 11/1971 | Johnson . |
| 5,325,601 | 7/1994 | Brownewell et al. . |

FOREIGN PATENT DOCUMENTS

| | | |
|---|---|---|
| 4028198 | 3/1991 | Germany . |
| WO 9324242 | 12/1993 | WIPO . |
| WO 9747395 | 12/1997 | WIPO . |

*Primary Examiner*—Bernard Pianalto
*Attorney, Agent, or Firm*—Alston & Bird LLP

[57] ABSTRACT

A process of applying an inorganic coating to an electrically conducting body, in particular a metallic workpiece, is characterized with respect to a precisely controllable temperature variation with short temperature changes in an economical and energy-saving operation in that the body first undergoes a preparation. Thereafter, if need be, the body is degreased and/or chemically pretreated and/or blasted. Subsequently, a coating medium is applied to at least the surface region of the body being coated. Then, at least the surface region of the body being coated is heated by induction to a reaction temperature before and/or while and/or after applying the coating medium. Finally, the coating medium is fully reacted to a coating, whereupon the body undergoes a cooling.

24 Claims, 1 Drawing Sheet

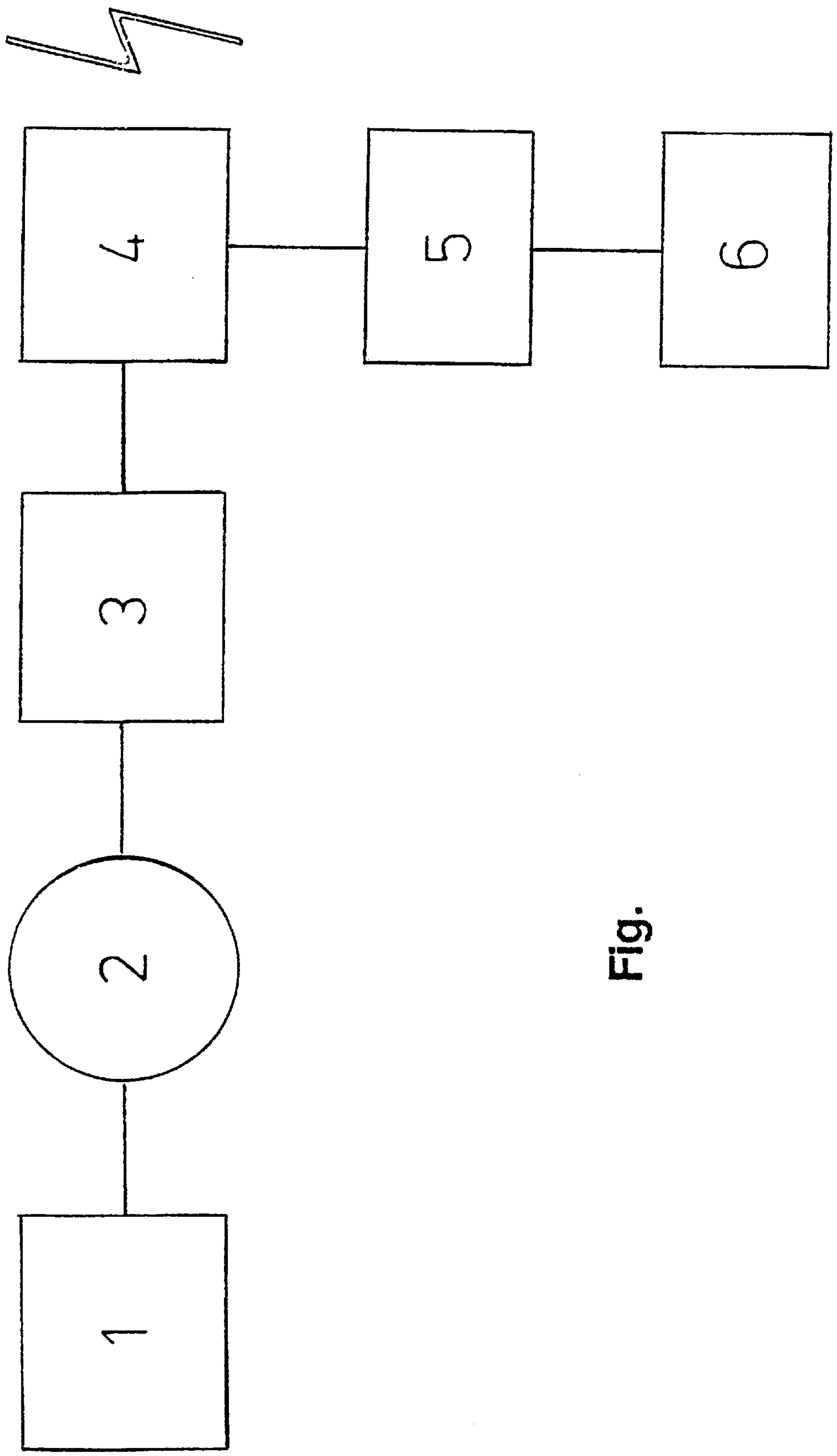
Fig.

PROCESS FOR APPLICATION OF AN INORGANIC COATING TO AN ELECTRICALLY CONDUCTING BODY

The invention relates to a process of applying an inorganic coating to an electrically conducting body, in particular to a metallic work piece.

From practice, large varieties of processes for applying an inorganic coating to an electrically conducting body are known. In these processes, the buildup of the coating medium occurs under the influence of temperature, which causes a reaction of the coating medium after it is applied to the body or the surface thereof. The reaction leads to the buildup of a substantially inorganic network. Depending on the used coating medium, differently high reaction temperatures are needed. Such reactions differ with respect to thermodynamics and kinetics substantially from reactions with organic coating media. Frequently, the described coating serves to protect the often-metallic body against corrosion. The above-described reaction normally occurs in convection ovens after the coating medium is applied. Depending on the coating medium, the reaction temperature is between 180° C. and 300° C. At these temperatures, the coating medium fully reacts to form the coating.

The use of such convection ovens is problematic in that the heating process of the body being coated proceeds very sluggishly. In this process, a change of the temperature requires a great deal of time. Based on the sluggish temperature variation, thermal conduction causes in most cases that the entire body is unnecessarily heated at the same time when the coating medium fully reacts in the surface region of the body. This simultaneous heating of the entire body requires a large amount of energy without contributing to the reaction process.

Furthermore, the use of the known convection ovens is disadvantageous, inasmuch as it is necessary to make the convection ovens so voluminous that the furnace fully accommodates the body being coated. Consequently, the realization of the known coating process requires a large amount of space in an uneconomical manner.

It is therefore the object of the present invention to describe a process of applying an inorganic coating to an electrically conducting body, which facilitates a precisely controllable temperature variation with short temperature changes in an economic and energy-saving operation.

The foregoing object is accomplished by a method comprising the steps of claim 1. Accordingly, a process of applying an inorganic coating to an electrically conducting body is characterized by the following steps:

First, the body is prepared. Subsequently, if need be, the body is degreased, and/or chemically pretreated, and/or blasted or sandblasted. This allows preparing the surface of the body for the coating, if required. Thereafter, a coating medium is applied to at least the surface region of the body, which is to be coated.

Therefore, in accordance with the invention, at least the surface region of the body, which is to be coated, is heated by induction to a reaction temperature before and/or while and/or after applying the coating medium. This inductive heating of the present invention permits realizing a heating of the body that is energetically quite especially advantageous, since only the surface region to be coated is heated and not necessarily the entire body. In this connection, a direct coupling to the electrically conducting body causes in the body the generation of eddy currents that lead based on the electric resistance of the body material to a heating of the body. Energy losses resulting from the heating of a heating medium in the form of, for example, recirculated air and its unavoidable radiation of heat are here prevented. Consequently, the heating is purposefully caused in the body or in its surface region. With that, a suitable controlling of the induction device facilitates a precisely controllable temperature variation with therefrom-resultant short temperature changes. Because of the inductive heating, the body is heated quasi from the inside out. In this connection, a highly efficient heating of the coating medium is likewise effected.

In summary, the heating process of the present invention by means of inductive heating is controllable in a simple manner via the energy supply to the associated induction heater. This results, based on the principle of direct energy transfer by induction, not only in a short heatup phase, but also in extremely short reaction times to temperature regulation or change procedures. Based on the direct heating of the surface region being coated, an economic and energy-saving operation is realized without requiring a space-wasting convection oven arrangement.

Depending on the requirements that are predetermined by the coating medium, it is possible to heat the surface region of the body being coated in a simple manner to a reaction temperature before and/or while and/or after applying the coating medium. This ensures a high flexibility of the process.

After the coating medium has fully reacted to form a coating, the last step of the process according to the invention includes cooling of the body. In this process, the body may be subjected to room temperature, which finally results in an automatic cooling of the body. However, cooling may also occur by an active process step with the use of a cooling medium.

Consequently, the process of the present invention specifies a process of applying an inorganic coating to an electrically conducting body, wherein a precisely controllable temperature variation is realized, with short temperature changes, in an economic and energy-saving operation.

With respect to a particularly flexible process that meets with individual requirements as are necessitated by the coating medium in use, it would be possible to heat by induction at least the surface region of the body being coated to a preheating temperature before applying the coating medium. In this case, the preheating temperature could be below the reaction temperature for purposes of avoiding a premature start of the reaction of the coating medium.

If need arises, the full reaction of the coating medium to the coating could occur with the participation of water. In this connection, it would be possible to supply separately the quantity of water necessary for the reaction. However, the water supply could also occur in a simple manner by an automatic extraction of the water from the air humidity of the surrounding atmosphere.

To protect the body against corrosion, the coating medium and, thus, the coating could contain pigments, preferably of zinc and/or aluminum. This would allow realizing an active protection against corrosion by the coating medium.

Depending on the requirements to be met by the coating, the coating medium could contain additives, such as for example internal lubricants, viscosity regulators, flow-control agents, and/or anticrater additives. There are no limits set to a possibility of individually compounding the coating medium.

With respect to especially favorable wearing characteristics, the coating medium could contain a binding agent of at least one organic and/or inorganic metal compound. In this connection, metal compounds are especially favorable that contain titanium, zirconium, chromium, boron, aluminum, silicon, cobalt, nickel, or magnesium. In the metal compound, the foregoing elements may be present individually or in combination. Furthermore, a high-molecular, aminocross-linked epoxy/phenoxy binder is suitable for use as a binder for the coating medium.

With respect to a favorable sequence of the cross-linking reaction that forms the coating, it would be possible to dissolve the binders, if need be, in a commercially available, organic solvent and/or in water. In the case of preheating the body, the preheating temperature could be between the room temperature and the boiling point of the solvent or water. This would ensure a controlled escape of the solvent or water from the coating as it builds up and, thus, realize an optimal concentration of the coating. Such a preheating could occur both before and after applying the coating medium. In the latter instance, a stepwise heating of the surface region of the body being coated would be realized when the coating medium is already applied.

The heating of the body being coated and the application of the coating medium may occur in two different parts of the plant. For this reason, in the instance—namely, when the body is preheated before applying the coating medium—there will be adequate time, after applying the coating medium, for the solvent or water to escape for the protection of the surface below the boiling point, while the body is being moved to the heating area. As soon as the solvent has escaped, it will be possible to raise the temperature of the surface being coated in few seconds to the necessary reaction temperature to obtain in this manner an optimal function and quality of the coating.

As regards a particularly favorable energy balance, it would be possible to heat the body by induction only within partial regions. Such a purposeful heating of only regions that are to be coated makes it possible to heat adjacent regions and/or electrically nonconductive substances or surface regions barely or only little at the same time. A heating of these regions would be possible only by thermal conduction. The purposeful application of heat further facilitates the coating on the one hand of individual parts of a device and on the other hand of complete devices. In this connection, it would be possible to coat, for example, fully assembled bearings as a whole or even only in selected places.

In an especially energy-saving manner, the heating could occur in a surface region of a depth of maximally 0.5 mm. When being heated accordingly for a short period, a thermal conduction to remaining regions of the body being coated would then have to be neglected.

To avoid heating in regions that are not to be coated or are sensitive to temperature, it would be possible to cool the body in part or as a whole with a suitable cooling medium during and/or after the heating. For use as a cooling medium, it would be possible to consider a gaseous or liquid coolant in the form of, for example, air, water, or oil. With that, temperature-sensitive regions of bodies being coated would be protected against temperature influence in a simple manner. Only with the use of inductive heating will it be possible to cool with air or liquid coolants temperature-sensitive places or regions of the bodies being coated simultaneously with the heating of the surface regions being coated.

With such a cooling, it is possible to take into account that the process of the present invention causes with the inductive heating a shortening of the reaction time, while clearly increasing the cross-linking temperature for realizing a totally cross-linked coating that fully exhibits its favorable properties only when being a fully cross-linked. However, a too high temperature may lead to the destruction of the network or the pigments and additives embedded therein. Consequently, a cooling of the body at the proper time may bring along different positive effects. In this connection, the cooling could start only after reaching the reaction temperature.

As regards a particularly high protective action, the coating could have a cathodic effect. Depending on need, the coating may be electrically and/or thermally conducting in addition or alternately to the cathodic effect. In this connection, an almost metallic conductivity could be realized.

As regards a lowest possible change in the dimension of the body from applying the coating, the coating could have a thickness from about 2 to 30 micrometers. If need be, this would allow realizing an extreme protection against corrosion in thinnest layers. In a further advantageous manner, the coating could also be weldable.

To avoid an excessive environmental stress, the coating could be free of heavy metals, in particular free of chromium IV and cadmium.

The control of the coating thickness could be adjusted on the one hand via the viscosity of the coating medium and on the other hand or in addition via a mechanical removal. With respect to a mechanical removal, same could occur in a simple manner by centrifuging. All other known methods of applying lacquer are likewise applicable.

If need arises, it will be possible to apply to the coating an additional organic covering layer. With respect to a most satisfactory possible adhesion, the composition of the covering layer may be adapted to the composition of the coating. With that, the binder will have a substantial influence. In connection with applying organic covering layers, high-molecular, amino-cross-linked epoxy/phenoxy binders of the covering layer will be especially advantageous.

The coating medium and/or covering layer are applied in a particularly simple manner by means of spraying, in particular electrostatic spraying, or even a dipping method. In combination with centrifuging, the dipping method is applied in particular in the case of bulk material.

With respect to a very precisely controllable temperature variation, the heating and/or cooling down or chilling may be computer-controlled. This would enable a fully automatic process sequence.

The coating parameters could be controlled in a particularly simple manner by the ac voltage frequency of the inductor and/or the induction duration and/or the reaction temperature.

The process of the present invention can be applied to all known technologies.

The application of an organic covering layer can be used for coloration, insulation, adjustment of a constant coefficient of friction, and improvement of the resistance to contact corrosion.

The use of induction devices includes in particular transistorized frequency changers, since same are especially favorable for carrying out precise, computer-controlled processes.

The process of applying an inorganic coating in accordance with the invention exhibits a high protective effect against chemical and electrochemical corrosion as well as contract corrosion of, for example, steel against aluminum. Furthermore, it realizes a high resistance of the coating in salt spray tests, condensation water tests, and Kesternich tests. A hydrogen embrittlement on the coated surfaces is absent.

While carrying out the process, short cycle times of seconds are possible. Because of the short temperature influence, a decrease in the strength of the structural part is far less critical than in the case of conventional heating.

Because of the low costs for energy and waste removal, the process of the present invention realizes an extremely environment-friendly process. The construction of a small and compact plant is possible.

There exist various possibilities of improving and further developing the teaching of the present invention. To this end, reference may be made on the one hand to the dependent claims, on the other hand to the following description of an embodiment of the method in accordance with the invention with reference to the drawing. In conjunction with the description of the preferred embodiment of the process according to the invention with reference to the drawing, also generally preferred embodiments and further developments of the teaching are described. In the drawing:

BRIEF DESCRIPTION OF THE DRAWING

The only FIGURE schematically illustrates within the scope of a block diagram the sequence of an embodiment of a process according to the invention for applying an inorganic coating to an electrically conducting body.

The only FIGURE schematically illustrates the sequence of an exemplary process of applying an inorganic coating to an electrically conducting body in accordance with the invention. The individual steps of the process are distinguished by the numerals 1 to 6.

Numeral 1 identifies the first step of the process, wherein a body is prepared. Process step 2 comprises an optional degreasing and/or chemical pretreatment and/or blasting, for example, sandblasting of the body. Should the body readied in step 1 need no further preparation, this step 2 of the process may be omitted.

In the next process step indicated by numeral 3, a coating medium is applied to at least the surface region of the body that is to be coated. In this process step, the coating medium could also be applied to surface regions of the body that are not to be coated. This would result in a subsequent removal of the coating medium from the surface regions that are not to be coated.

The following step indicated at numeral 4, namely the inductive heating of at least the surface region of the body that is to be coated, could occur before and/or during and/or after the application of the coating medium. Depending on the need, a preheating of at least the surface region being coated is possible before applying the coating medium. This could favor an escape of the solvents that are not needed during the cross-linking reaction of the coating medium.

Normally, the coating exhibits a high thermal resistance up to about 350° C. A too high temperature can destroy the coating. Furthermore, a too high temperature, in particular over a longer period of time, is also damaging to heat-sensitive regions of the body being coated, so that the short-time treatment by means of induction has in this instance a particularly advantageous effect. In any event, it should be noted that a maximum temperature be not exceeded.

Furthermore, it is possible only with the use of inductive heating to cool with air or liquid media temperature-sensitive parts of the bodies being coated at the same time as the regions being coated are heated.

After the inductive heating, the coating medium undergoes in process step 5 a full reaction to form the coating. In so doing, the induction heating facilitates at a lesser cost in comparison with the conventional circulating air technique a rapid formation of a fully cross-linked coating or protective coating. This rapid reaction thermodynamics and reaction kinetics cause a distinct increase in the crosslinking temperature to realize a fully cross-linked coating that exhibits the described properties only on full scale. Since a too high temperature can lead to the destruction of the network or therein-embedded pigments and additives, a temperature control is advantageous.

In the last process step of an embodiment of the process according to the invention, as indicated by numeral 6, the body is cooled. This cooling may occur by a passive cooling down in, for example, ambient air, or by means of an active cooling by a special coolant, such as water or oil.

The inductive heating is best suited for the full reaction of the coating media on partially coated, more or less large bodies, for the full reaction of bodies coated over their entire surface, or even for coating bulk materials. In this connection, the described process is of advantage, inasmuch as multiple coatings resulting from defect or contact locations become unnecessary. The spraying of preheated bulk materials during the movement of their distribution ensures a particularly uniform coating without defects when such bodies are coated.

With the use of the dipping process for applying the coating medium, it is also possible to dip in particular preheated bodies.

As regards further advantageous developments of the process according to the invention, the general part of the description as well as the attached claims are herewith incorporated by reference for purposes of avoiding repetitions.

Finally, it should be explicitly pointed out that the above-described embodiment of the process according to the invention serves only for explaining the claimed teaching without, however, limiting same to the embodiment.

What is claimed is:

1. A process of applying an organic and/or inorganic coating to at least a surface region of an electrically conductive body comprising:

preparing at least a surface region of the electrically conductive body to be coated to receive the coating;

preheating by induction at least the surface region of the electrically conductive body to an initial temperature above ambient temperature and below a reaction temperature of the coating and not above the boiling point of a solvent or water;

applying a coating medium to the surface of said electrically conductive medium to be coated, said coating medium comprising a binder of at least one organic and/or inorganic metal compound dissolved in an organic solvent and/or water;

heating by induction the coated surface of the electrically conductive body to a reaction temperature while fully reacting the coating medium into a coating; and cooling the coated body.

2. A process according to claims 1 wherein the reaction of the coating medium into a coat occurs with the participation of water.

3. A process according to claim 2 wherein the water participating in the reaction of the coating medium into a coating is extracted from the humidity in the ambient atmosphere.

4. A process according to claim 1 wherein said binder comprises pigments of zinc and/or aluminum.

5. A process according to claim 1 wherein said coating medium includes at least one of internal lubricants, viscosity regulators, flow-control agents and anticrator additives.

6. A process according to claim 1 wherein said metal compound includes at least one of titanium, zirconium, chromium, boron, aluminum, silicon, cobalt, nickel and magnesium.

7. A process according to claim 1 wherein only a portion of the surface of said electrically conductive body is heated inductively.

8. A process according to claim 1 wherein said inductive heating of a surface region of said body occurs to a maximum depth of 0.5 mm.

9. A process according to claim 1 wherein said coated body is cooled by a cooling medium.

10. A process according to claim 9 wherein said cooling medium is selected from a group consisting of air, water and oil.

11. A process according to claim 1 wherein said coating provides cathodic protection against corrosion.

12. A process according to claim 1 wherein said coating has a thickness of about 2 to 30 micrometers.

13. A process according to claim 1 wherein said coating is devoid of heavy metals, including particularly chromium IV and cadmium.

14. A process according to claim 1 wherein the coating thickness is adjusted by varying the viscosity of the coating medium.

15. A process according to claim 1 wherein the coating thickness is adjusted by mechanical removal.

16. A process according to claim 15 wherein the mechanical removal occurs by centrifuging.

17. A process according to claim 1 wherein said coating includes an additional organic covering layer.

18. A process according to claim 17 wherein the composition of the additional organic covering layer is adhesively compatible with the composition of the remainder of the coating for satisfactory adhesion therebetween.

19. A process according to claim 17 wherein said additional organic covering layer includes a high-molecular, amino-cross-linked epoxy/phenoxy binder.

20. A process according to claim 1 wherein the coating medium is applied by spraying thereof onto the surface being coated.

21. A process according to claim 20 wherein the coating medium is applied by electrostatic spraying.

22. A process according to claim 1 wherein the coating medium is applied by dipping the surface being coated into the coating medium.

23. A process according to claim 1 wherein the induction heating and/or cooling are computer-controlled.

24. A process according to claim 1 wherein the coating parameters are controlled by one or more of the AC voltage frequency of the inductor, the duration of the induction and/or the reaction temperature.

* * * * *